United States Patent [19]

Cheseldine

[11] 4,017,773
[45] Apr. 12, 1977

[54] SOLID VALVE-METAL CAPACITOR WITH BURIED GRAPHITE IN THE PARTICLES IN THE ELECTROLYTE

[75] Inventor: David M. Cheseldine, Bennington, Vt.

[73] Assignee: Sprague Electric Company, North Adams, Mass.

[22] Filed: May 27, 1975

[21] Appl. No.: 581,192

[52] U.S. Cl. .............................. 361/433; 29/570; 361/311

[51] Int. Cl.$^2$ .................. H01G 9/00; H01G 9/16; B01J 17/00

[58] Field of Search ............. 317/230, 242; 29/570

[56] References Cited

UNITED STATES PATENTS

| 2,936,514 | 5/1960 | Millard | 317/230 |
| 3,139,568 | 6/1964 | Ishikawa et al. | 317/230 |
| 3,166,693 | 1/1965 | Haring et al. | 317/230 |
| 3,241,008 | 3/1966 | Komisarek | 317/230 |
| 3,581,159 | 5/1971 | Piper | 317/230 |
| 3,656,027 | 4/1972 | Isley | 317/230 |

Primary Examiner—Andrew J. James
Attorney, Agent, or Firm—Connolly and Hutz

[57] ABSTRACT

The electrolyte of a solid tantalum capacitor consists of manganese dioxide which is coated with an outer layer of graphite over which there is deposited a metal containing counterelectrode. Buried within the manganese dioxide is at least one layer of graphite and the intervening manganese dioxide between adjacent layers of graphite contains graphite particles that electrically connect the adjacent graphite layers. The capacitor may be subjected to temperatures up to 360° C for several minutes without substantial degradation of the characteristic series impedance, even where the capacitor package contains organic materials.

8 Claims, 2 Drawing Figures

SOLID VALVE-METAL CAPACITOR WITH BURIED GRAPHITE IN THE PARTICLES IN THE ELECTROLYTE

BACKGROUND OF THE INVENTION

This invention relates to solid electrolyte valve-metal capacitors and more particularly to tantalum capacitors having a solid manganese dioxide electrolyte with graphite being buried in portions thereof.

It is well known that a solid electrolytic valve-metal capacitor may be manufactured by the following method. A sintered porous tantalum body is anodized formin a film of tantalum oxide over all its exposed surfaces. Several coatings, typically about eight, of a manganous nitrate solution are applied over the tantalum oxide including regions in the pores of the tantalum body. Each coating is fired at a temperature of about 400° C, pyrolyzing and transforming the manganous nitrate to a semiconductor, namely manganese dioxide ($MnO_2$). The composite coating of pyrolyzed $MnO_2$ is then coated with a layer of graphite from an aqueous suspension, a layer of silver from a paint suspension, a layer of solder, and a metallic conductor. The body of the unit may then be encapsulated for example, in an epoxy resin.

Electronic components including solid electrolyte capacitors are frequently required to withstand 360° C for several minutes, while they are being solder connected to printed wire boards or other circuit assemblies. In the above noted standard capacitor construction, failure at 360° C typically occurs due to inadequacies in the silver, the solder, and the encapsulating resin. For example, the organic binder in the silver is subject to degradation and the organic vapors cause reduction of $MnO_2$ to species of lower conductivity; the silver metal may also be leached by the covering layer of solder. The solder is applied with flux which is another source of organic vapors liable to cause reduction of $MnO_2$. The solder itself is molten at 360° C which is clearly an undesirable feature. The most severe problem of all is caused by vapors from the encapsulating resin. Also, encapsulation intensifies the reaction of any vapors from the binder or flux due to entrapment.

Attempts have been made to replace the silver/solder system with a sprayed metal system which is usually a high melting solder such as 95% lead, 5% tin. However this construction is more difficult to carry out and leads to lower yields. In addition, the sprayed solder is molten at 360° C and solder droplets are often observed on the outside of the units after exposure. It also does nothing to alleviate the problem of vapors from the molding resin interacting with $MnO_2$. For these reasons it is quite inadequate for 360° C exposure although it has made possible units which may be exposed to 300° C which is somewhat higher than the standard units will withstand.

A forthright but expensive solution to this problem has been to house the conventional capacitor without any organic material in a hermetically sealed metal can.

In a presently pending patent application, Ser. No. 540,028 filed Jan. 10, 1975, a capacitor is described that solves this problem in a more subtile manner. The counterelectrode consists of a base metal part that is buried in the composite $MnO_2$ coating. Direct contact between the base metal and the easily reducible $MnO_2$ is avoided by plating the base metal with a noble metal or by covering it with a graphite coating. The present invention provides an alternative and complementary solution to this problem.

It is therefore an object of the present invention to provide a novel counterelectrode system in a solid valve metal capacitor.

It is a further object of the present invention to provide a low cost solid valve-metal capacitor requiring no new steps in manufacturing.

It is a further object of this invention to provide a solid valve-metal capacitor having superior performance characteristics especially after exposure to elevated temperatures.

It is yet a further object of this invention to provide a solid valve-metal capacitor having a housing of an inexpensive organic material, that is capable of exposure to soldering processes involving temperatures as high as 360° C for several minutes without degradation.

SUMMARY OF THE INVENTION

A solid electrolyte capacitor has a porous valve-metal body, an oxide film of the valve-metal covering the surfaces of the porous body, and a solid electrolyte coating of manganese dioxide overlying the oxide film. On the outer surface of the manganese dioxide coating is a layer of graphite that is in turn covered by a conductive counterelectrode that may be comprised of metal particles such as silver, copper or nickel being bonded to the outer graphite layer and to each other by an organic bonding agent such as a silicone resin or an epoxy.

Buried within the manganese dioxide coating is one or more graphite layers. The adjacent of the graphite layers, including the outer layer, have a layer portion of the manganese dioxide coating sandwiched there between. The sandwiched manganese dioxide contains graphite particles that electrically connect the adjacent graphite layers. This capacitor section may additionally have a housing protective outer encapsulation containing or consisting of an organic material. When such a capacitor is soldered into a circuit and is exposed to temperatures as high as 360° C for several minutes, organic vapors are generated that permeate an outer portion of the manganese dioxide coating that is sandwiched between graphite layers and reduces some or all of this sandwiched manganese dioxide. Thus, although the sandwiched manganese dioxide becomes reduced and highly resistive, the high conductivity of the manganese dioxide lying between the innermost buried graphite layer and the dielectric oxide film remains unchanged and the innermost buried graphite layer has a low electrical impedance graphite path to the counterelectrode.

In addition to the sandwiched manganese dioxide layers being near the outer surface and closer to the source of the reducing organic vapors, the selective reduction of only these layers is believed to be enhanced by the adsorption and consumption of the vapors in the outer sandwiched layers.

A method for making these capacitors includes anodizing a porous valve-metal body to form a dielectric film of valve-metal oxide thereon, and building a coating of manganese dioxide over the anodized body by repeatedly applying and pyrolyzing a manganese salt over the body to form successive $MnO_2$ layers. After some of these layers have been built, a graphite layer is deposited by applying a dilute solution of colloidal graphite and drying the graphite. Over this first graphite layer there is formed another layer or more of $MnO_2$. In this way a first buried graphite layer is formed. Further buried layers may then be included after application of additional layers of $MnO_2$, as desired. Finally an outer graphite coating is deposited and a conductive counterelectrode is formed over the outer graphite layer as by applying a silver powder loaded silicone resin and curing the resin, preferably at elevated temperatures substantially less than 360° C so as to reduce but a small fraction of the sandwiched portions of the $MnO_2$ coating.

Thus it can be seen that a capacitor of this invention is capable of including organic materials in its construction that produce hot organic vapors during its manufacture, and is further capable of exposure to high soldering temperatures for assembly into circuits, all with no substantial degradation of the series a.c. impedance.

DESCRIPTION OF THE PREFERRED EMBODIMENTS

Figure 1:
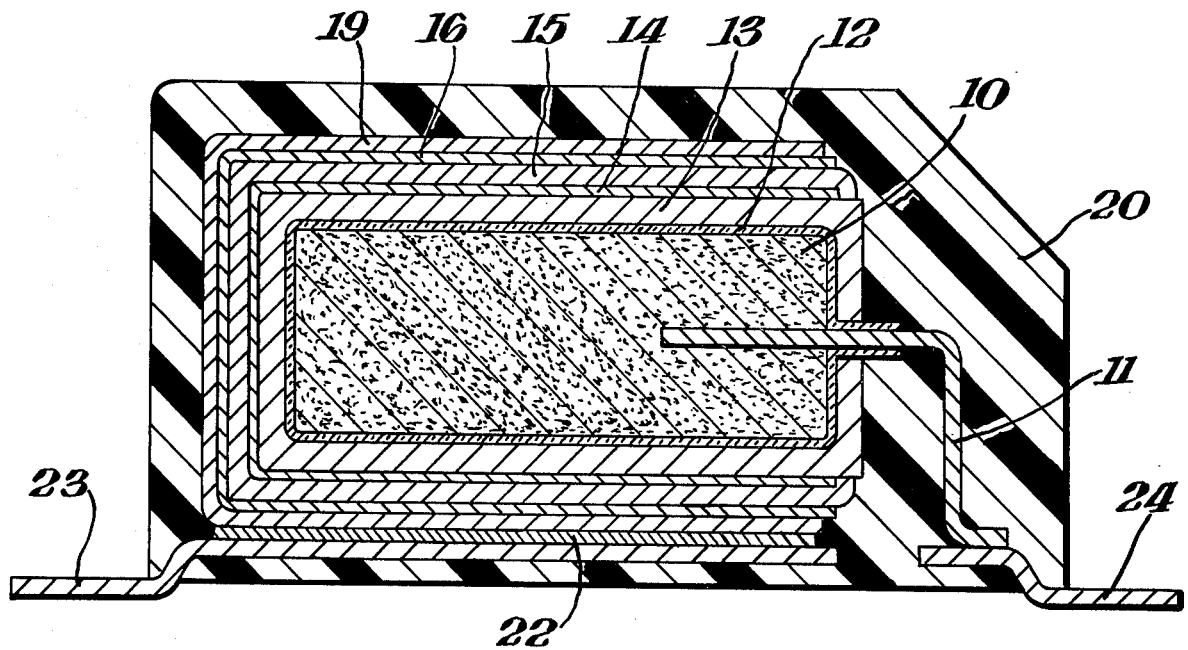
FIG. 1 shows a side sectional view of a capacitor of this invention.

The structural features of a capacitor of this invention are shown in cross section in FIG. 1. A rectangular porous tantalum body 10 has a tantalum riser wire 11 partially embedded therein. The tantalum body 10 serves as the anode of the capacitor. More generally, the capacitors of this invention employ porous valve-metal bodies, which valve-metals include tantalum, aluminum, titanium and niobium. A tantalum oxide dielectric film 12 is grown over the surfaces of the body including surfaces within the pores. The oxide 12 is simple represented in FIG. 1 as lying over the outer surface portions of the body 10.

A coating 13 of manganese dioxide lies over and adjacent to the oxide film 12. This coating is formed by first applying a dilute solution of manganous nitrate in the pores and over the oxide film that conforms to all body surfaces. By subjecting the body to about 300° in steam, the manganous salt is pyrolytically converted to a solid semiconducting manganese dioxide ($MnO_2$). Pyrolysis may also be accomplished by heating in a dry atmosphere at about 400° C. A second application of the manganous salt is again pyrolyzed as before, and yet a third and so on until a sufficiently thick coating 13 of manganese dioxide is formed over the body. Up to this point the manufacturing steps are all conventional.

Figure 2:
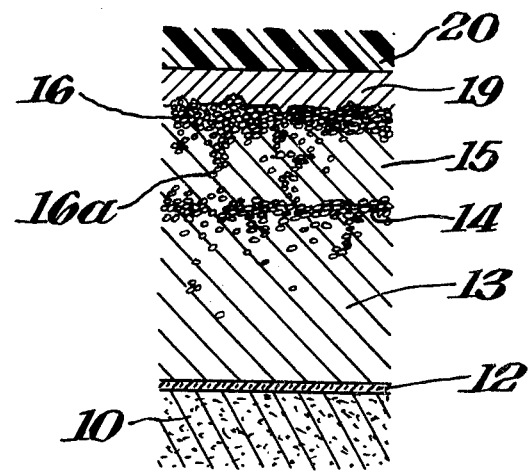
FIG. 2 shows a magnified detail of the capacitor of FIG. 1.

A layer of graphite 14 is then applied over the $MnO_2$ coating 13. Another coating of $MnO_2$ 15 is then applied over the graphite layer 14 and yet another layer of graphite 16 is formed over the outer $MnO_2$ coating 15. Thus the outer coating 15 of $MnO_2$ is seen as being sandwiched between the two graphite layers 14 and 16; however, these two graphite layers are not entirely separate as is shown in the detail of FIG. 2 and as will be explained.

Over the outer layer 16 of graphite there is a relatively heavy coat 19 of a metal bearing material that serves as the counterelectrode of the capacitor. A metal cathode lead 23 is electrically and physically attached to the counterelectrode 19 by means of a conductive material 22 being bonded therebetween. The anode riser wire 11 is welded or otherwise attached to a metal anode lead 24. A silicone resin or other suitable organic material serves as the housing encapsulant 20 encompassing the body and a portion of the leads 23 and 24.

Thus a basic capacitor section of this invention consists of elements designated 10 through 19. The section is shown in FIG. 1 encapsulated in housing 20 and having package leads 23 and 24.

The preferred steps for making the capacitor of this invention are as follows:

A porous tantalum body is anodized in a conventional manner to form the oxide. This is then coated with $MnO_2$ by pyrolytic decomposition of manganous nitrate using the conventional technique of first applying dilute solutions to penetrate and coat the whole surface of the body followed by more concentrated solutions to achieve the required build up of $MnO_2$ on the outside of the body. In a conventional construction, from 5 to 10 dips in a concentrated solution such as 1.78 specific gravity manganous nitrate is typically required to achieve the required build up. In the construction of this invention, a similar, or greater number of top coats is employed. Starting with about the fourth or fifth top coat, however, the capacitor of this embodiment is coated with aquadag which is a colloidal graphite suspension. The aquadag is then dried at any suitable temperature, such as 150° C for ten minutes. The aquadag is applied an an aqueous solution of about 2 to 4% solids concentration.

After forming this first graphite layer, one or more further coats of $MnO_2$ are pyrolytically deposited. Next, another layer of graphite is formed. At this point the capacitor section may be completed by applying a metallic coating to form the counter-electrode and cathode connection. Such a unit in the near presence of organic material will show greater impedance stability during 360° C exposure than will a prior art unit in which graphite is applied only after completion of pyrolysis.

Moreover, even greater stability can be achieved by applying further alternating coats of $MnO_2$ and graphite. The number of such coats which may be applied is limited only by the dimension to which the final capacitor has to conform. Thus, a to be buried graphite layer is formed, such as layer 14 shown in FIG. 1. From one to four applications of aquadag are preferably employed to form each such buried layer.

It has been observed that the last of a series of pyrolyzed $MnO_2$ layers is porous and friable compared to the relatively dense and nonporous underlying layers of $MnO_2$. It is postulated that such a porous layer is permeated by a subsequently applied manganous nitrate solution as well as covered by a layer of this solution, such that upon a subsequent pyrolysis step a new porous $MnO_2$ layer is formed over said last layer and said last layer is filled and no longer porous. Microscopic views of cross sections of typical $MnO_2$ layers of partially completed capacitors support this hypothesis.

In a capacitor of this invention including a layer of $MnO_2$ being sandwiched between two graphite layers, the intervening or sandwiched layer of $MnO_2$ contains enough graphite particles to effectively short circuit this sandwiched $MnO_2$ layer. Thus the metal counter-electrode that overlies and electrically contacts the outer graphite layer is always in direct electrical contact with the buried graphite layer without depending upon the intervening $MnO_2$ for this purpose. Therefore, when or if the intervening $MnO_2$ is reduced and made highly resistive as by hot organic vapors, the electrical connection, existing between the metal bearing counter-electrode and the dense $MnO_2$ coating that underlies the buried graphite layer, is not lost or substantially degraded.

The exact processing point at which the first coat of graphite may be applied is determined by the desirability of keeping the highly conductive carbon from contacting the tantalum oxide surface or from penetrating the $MnO_2$ structure to any point at which it might cause an increase in leakage current. The graphite may be deposited following the first top coat of $MnO_2$ and following each subsequent top coat. However, unless this coat is adequately thick, such a procedure leads to loss of many units due to excessive leakage current. It is therefore desirable that sufficient $MnO_2$ be applied before depositing the graphite to prevent losses due to high leakage current.

The number of $MnO_2$ layers required prior to the application of the first graphite layer will depend on the method used to deposit them. Thus, in the method described by Fournier et al in U.S. Pat. No. 3,950,842 issued Apr. 20, 1976 which deposits heavy layers of $MnO_2$ particles and manganous nitrate, only one such layer might be required. Other methods of forming a thick layer of $MnO_2$ are described in U.S. Pat. Nos. 3,481,029, issued Dec. 2, 1969, and 3,241,008, issued Mar. 15, 1966. Using a method in which $MnO_2$ is built up by dipping in a concentrated manganous nitrate solution having a specific gravity of about 1.78 g/cc. three to five layers would give a suitable build up before the introduction of the first layer of graphite. This foundation layer of $MnO_2$ is thus preferably thicker than about 0.002 inch regardless of how obtained.

Following pyrolysis of the last $MnO_2$ coat, a final outer layer of graphite is applied which may be formed by applying one or more coats of the graphite suspension. Typically the oxide film is reformed after pyrolysis, and good results have been obtained by depositing the graphite either immediately prior to and immediately after this reformation. Alternately, only one coat need be applied which may be done either before or after reformation.

The capacitor is coated with a conducting layer such as a silver paint or a sprayed metal. It may then be attached by a conducting medium to a solderable metal lead. Many such methods of terminating may be used provided they will withstand exposure to 360° C. In a preferred embodiment of this invention, the unit is coated with a conducting paint such as Eccobond 59C, made by Emerson and Cumming Inc., Canton, Mass., which is a silicone resin containing silver particles that is cured for 30 minutes at 200° C. Another coat of the 59C is then applied to an area of the capacitor section and is used to cement a suitable termination in place. Such termination may typically be a metal can in which the capacitor is contained or a metal lead frame strip or a wire. After thoroughly baking at about 250° C to cure and to remove the most volatile organic vapors from the conducting compounds, the capacitor may be hermetically sealed in a metal can, or may be encapsulated in a resin.

To illustrate the beneficial effects which may be obtained from the practice of the invention, Table I presents impedance values of experimental solid electrolyte tantalum capacitors having various numbers of buried graphite layers. The impedance of each is given for before and after heating at 360° C for 3 minutes and again after 6 minutes. The capacitors are 22μf, 10V tantalum capacitors having a counterelectrode of Eccobond 59C silver paint and being molded in a silicone resin, namely resin part number 306 made by Dow Corning Corp., Midland, Mi.

TABLE I

| | | Impedance (Ohms) | | |
|---|---|---|---|---|
| No. of $MnO_2$ layers prior to first graphite | Total No. of graphite layers | Initial | After 360° C/ 3 min. | After 360° C/ 6 min. |
| 1. | 5 | 3 | 0.14 | 0.24 | 0.44 |
| 2. | 5 | 4 | 0.14 | 0.22 | 0.34 |
| 3. | 5 | 5 | 0.14 | 0.23 | 0.32 |
| 4. | 6 | 2 | 0.14 | 0.28 | 0.60 |
| 5. | 6 | 3 | 0.15 | 0.23 | 0.35 |
| 6. | 6 | 4 | 0.15 | 0.23 | 0.32 |
| 7. | 6 | 1 | 0.15 | 4.2 | — |
| 8. | 6 | 1 | 0.15 | 20.4 | — |

The experimental capacitors of examples 1 through 6 fall within the scope of this invention. By contrast, data from a capacitor which was constructed in exactly the same manner except that only one layer of graphite was applied, namely after completion of pyrolysis, is exhibited as example 7.

By further way of contrast, data from an experimental capacitor, example 8, constructed with only a single conventional layer of graphite after completion of pyrolysis and with an epoxy case, gave the results shown. It is concluded that a silicone resin encapsulation is preferred over an epoxy material and that generally only one buried graphite layer is required for a silicone resin encapsulated capacitor.

Although in making the preferred embodiment of this invention as described, graphite particles are introduced into the sandwiched $MnO_2$ coating by applying aquadag over the porous $MnO_2$ that overlies a buried graphite layer, a variety of other methods may be used to accomplish the same purpose, and are understood to fall within the scope of this invention. For example, the manganous nitrate, that is applied over a to be buried graphite layer, may itself contain graphite particles. As a further example, instead of introducing the graphite by means of a suspension as has previously been described it may be introduced as a dry powder. The units may be coated with a liquid to which the graphite will adhere when it is either sprayed at the units or they are immersed in the powder as for example in a fluidized bed.

What is claimed is:

1. In a solid electrolytic capacitor including a porous valve-metal body, an oxide film of said valve-metal covering the surfaces of said body, a solid electrolyte coating of manganese dioxide overlying said oxide film, an outer layer of graphite lying over the outer surface of said manganese dioxide coating, and a conductive counterelectrode overlying said outer layer of graphite, the improvement comprising at least one buried layer of graphite that is buried within said manganese dioxide coating, defined at least one sandwiched layer portion of said manganese dioxide coating between adjacent of said graphite layers, said sandwiched portion containing particles of graphite that provide a low electrical impedance between said adjacent graphite layers.

2. The capacitor as claimed in claim 1 additionally comprising a metal cathode lead having one end thereof connected to said counterelectrode, an anode riser wire extending from said body, a metal anode lead connected to said riser wire, and an organic encapsulant encompassing said capacitor body and said connected portion of said leads, said encapsulant serving as a protective housing for said capacitor.

3. The capacitor as claimed in claim 2 wherein said connection between said counterelectrode and said cathode lead is effected by a resin layer that is positioned therebetween and bonded thereto, said resin layer containing metal particles and being electrically conductive.

4. The capacitor as claimed in claim 3 wherein said resin and said encapsulant are a silicone resin.

5. The capacitor as claimed in claim 1 where said conductive counterelectrode is comprised of metal particles that are interbonded by an organic bonding agent.

6. The capacitor as claimed in claim 5 wherein said metal particles consist of a metal selected from silver, copper and nickel.

7. The capacitor as claimed in claim 5 wherein said bonding agent is a silicone resin.

8. The capacitor as claimed in claim 1 wherein the spacing, within said manganese dioxide coating, between said buried graphite layer and said body is no less than 0.002 inches.

* * * * *